United States Patent
Goyal et al.

(10) Patent No.: US 10,423,410 B1
(45) Date of Patent: Sep. 24, 2019

(54) SOURCE CODE RULES VERIFICATION METHOD AND SYSTEM

(71) Applicant: Amazon Technologies, Inc., Seattle, WA (US)

(72) Inventors: Alok Goyal, Redmond, WA (US); Omer Shabtai Jakobinsky, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/691,655

(22) Filed: Aug. 30, 2017

(51) Int. Cl.
*G06F 9/44* (2018.01)
*G06F 11/36* (2006.01)
*G06N 3/08* (2006.01)
*G06N 99/00* (2019.01)
*G06F 8/77* (2018.01)
*G06N 3/04* (2006.01)

(52) U.S. Cl.
CPC ............ *G06F 8/77* (2013.01); *G06F 11/3616* (2013.01); *G06N 3/0445* (2013.01); *G06N 3/08* (2013.01)

(58) Field of Classification Search
CPC ..... G06F 8/71; G06F 8/75; G06F 8/35; G06F 8/20; G06F 17/5081; G06F 11/3688; G06F 11/3668; G06F 8/77; G06F 8/30; G06F 8/36; G06F 11/3664; G06F 11/3604; G06F 11/3616; G06N 3/0445; G06N 3/08
See application file for complete search history.

(56) References Cited

U.S. PATENT DOCUMENTS

| | | | |
|---|---|---|---|
| 9,110,770 B1* | 8/2015 | Raju | G06F 8/77 |
| 9,519,477 B2* | 12/2016 | Champlin-Scharff | G06F 9/454 |
| 9,542,181 B2* | 1/2017 | Boudreau | G06F 8/24 |
| 9,898,393 B2* | 2/2018 | Moorthi | G06F 11/368 |
| 9,928,040 B2* | 3/2018 | Tarlow | G06F 8/34 |
| 9,990,187 B1* | 6/2018 | Carroll | G06F 8/41 |
| 10,055,205 B2* | 8/2018 | Di Balsamo | G06F 16/3331 |
| 10,140,886 B2* | 11/2018 | Du | G09B 19/0053 |
| 2004/0003011 A1* | 1/2004 | Broussard | G06F 17/30067 |

(Continued)

OTHER PUBLICATIONS

Chen et al., Software process evaluation: A machine learning approach, 10 pages (Year: 2011).*

(Continued)

*Primary Examiner* — Thuy Dao
(74) *Attorney, Agent, or Firm* — Davis Wright Tremaine LLP

(57) ABSTRACT

A computer system processes an authoritative piece of source code to identify one or more formats with which the piece of source code is compliant. A second non-authoritative piece of source code is processed, and the system determines whether in the second non-authoritative piece of source code complies with the one or more formats. In an embodiment, the computer system provides suggestions to make the second non-authoritative piece of source code compliant with the authoritative piece of source code. In an embodiment, the authoritative piece of source code is in a shared source code repository, and the computer system designates the authoritative piece of source code as authoritative based at least in part on the relative age, stability, or authorship of the authoritative source code and other source code in the repository.

20 Claims, 12 Drawing Sheets

(56) References Cited

U.S. PATENT DOCUMENTS

| | | | | |
|---|---|---|---|---|
| 2010/0005446 | A1* | 1/2010 | Drissi | G06F 8/36 717/114 |
| 2012/0159434 | A1* | 6/2012 | Dang | G06F 8/36 717/120 |
| 2014/0189671 | A1* | 7/2014 | Dujmovic | G06F 17/30174 717/168 |
| 2016/0103754 | A1* | 4/2016 | Aggarwal | G06Q 10/06 717/126 |
| 2017/0109140 | A1* | 4/2017 | Lalka | G06F 8/34 |
| 2017/0161179 | A1* | 6/2017 | Maple | G06F 11/3684 |
| 2018/0107478 | A1* | 4/2018 | Codato | G06F 8/71 |
| 2018/0349105 | A1* | 12/2018 | Makkar | G06F 8/36 |
| 2019/0026108 | A1* | 1/2019 | Byrd | G06F 9/44 |

OTHER PUBLICATIONS

Devroey et al., Towards statistical prioritization for software product lines testing, 8 pages (Year: 2014).*

"Coding Conventions," Wikipedia, The Free Encyclopedia, Aug. 21, 2017, <https://en.wikipedia.org/wiki/Coding_conventions> [retrieved Aug. 30, 2017], 7 pages.

* cited by examiner

SOURCE CODE RULES VERIFICATION METHOD AND SYSTEM

BACKGROUND

Maintaining the consistency of source code in a large repository is a difficult and important problem. In a typical large software development project, new programmers are added to a software project as other programmers leave the project, and responsibility for different portions of the source code typically changes over time. For a variety of reasons, new programmers often have difficulty when working with established unfamiliar code. One reason for this is differences in programming style. Different programmers often apply their own personal preferences and styles to their work, and when that work is transitioned to a new person that prefers a different style, the differences in style make the code more difficult to understand. As a result, many organizations impose code conventions, which are a set of rules that define a preferred style, formatting, and structure for the code. Setting and enforcing a code convention standard is important for the long term success of a software project, but can be very time consuming and politically challenging for the committee or managing entity setting the rules.

BRIEF DESCRIPTION OF THE DRAWINGS

Various techniques will be described with reference to the drawings, in which.

DETAILED DESCRIPTION

Figure 1:
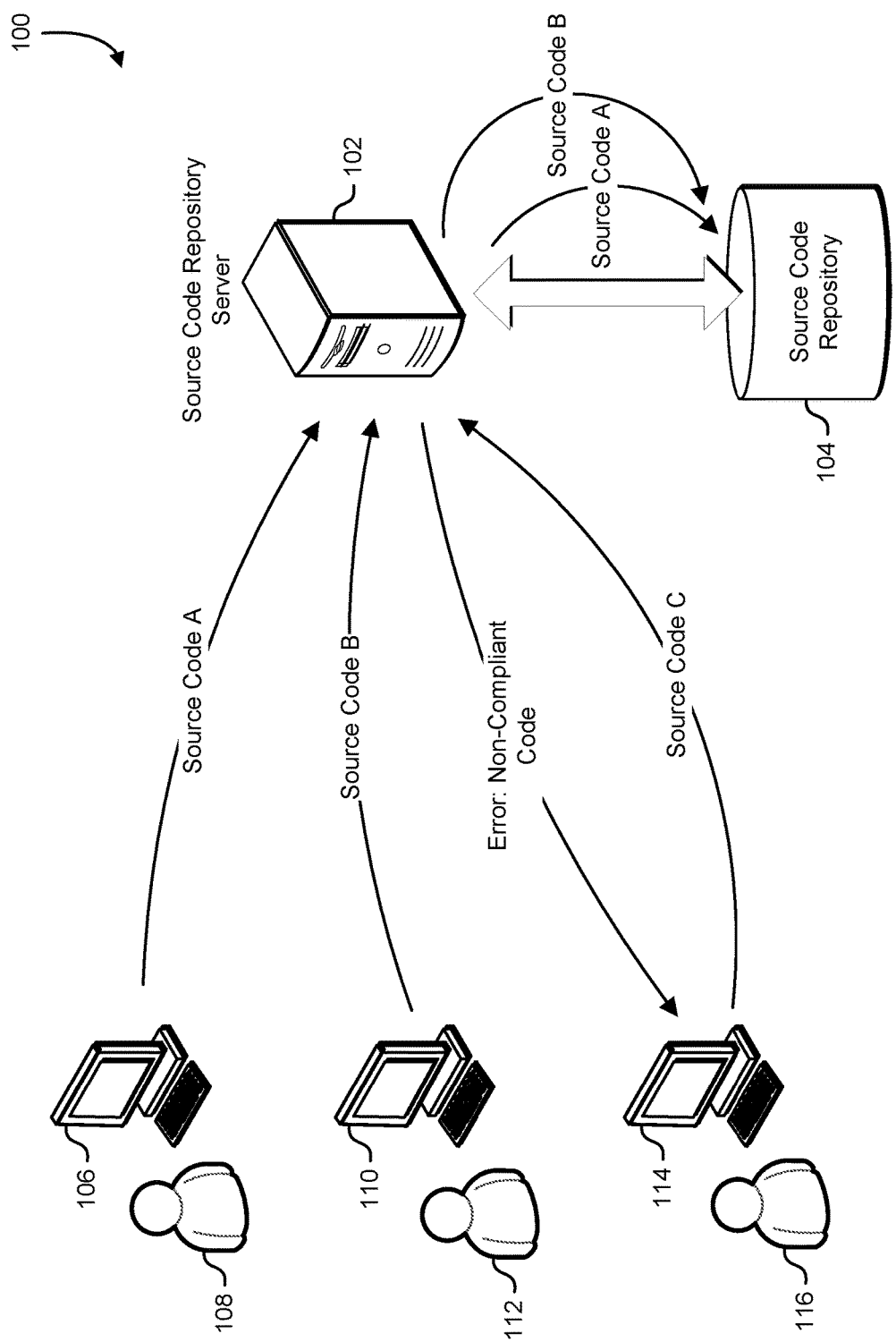
FIG. 1 shows a system in accordance with one embodiment.

The present document describes a computer system that processes an authoritative piece of source code to identify one or more formats with which the authoritative piece of source code is compliant. When the computer system is presented with a second non-authoritative piece of source code, in an embodiment, the computer system determines whether the second non-authoritative piece of source code complies with the one or more formats. In an embodiment, the computer system provides suggestions to make the second non-authoritative piece of source code compliant with the authoritative piece of source code. In an embodiment, the computer system identifies authoritative pieces of code within a source code repository using a variety of source code metrics, identifies the code conventions or formats exhibited by the authoritative pieces of source code, and then applies the code conventions and formats to other non-authoritative code in the source code repository. Because the system learns coding rules by examining the existing code base, the system is able to easily incorporate new coding rules as the code base evolves.

In an embodiment, the computer system designates the authoritative source code as authoritative based at least in part on the relative age, stability, and/or authorship of the authoritative and non-authoritative pieces of source code. In an embodiment, the computer system determines the origination date of each source code file in a source code repository, and selects the authoritative source code from the oldest source code in the repository. In an embodiment, the computer system determines the author of each source code file in a source code repository and determines a ranking for each author that is indicative of the quality of the source code produced by each author. Source code files that are written by authors that tend to produce high-quality code are deemed to be authoritative, and may be used to discover coding rules or code conventions that should be applied to other source files in the source code repository. In an embodiment, the computer system determines the stability of each source code file in a repository, and identifies authoritative source code based on the determined stability. In an embodiment, stability is determined based on the date of the last modification to a source file, and stability is determined by the rate of modifications to the source file.

In one embodiment, the computer system identifies code conventions, styles, variable naming conventions, or other formats used by the authoritative source code files. Code conventions are rules that describe how whitespace and other human readable elements of the source code are arranged. For example, the indentation of code blocks, the naming of variables and functions, and the usage of certain optional language syntax features may, in one embodiment, be specified in a code convention. Additional examples of formats that may be exhibited in various embodiments include the presence of multiple statements on one line, mixing of tabs with spaces, trailing whitespace, excessive blank lines, lack of blank space between functions or classes, spaces within parameters, camel case variables, delimiter-separated or all-lowercase names, long lines, excessive lines in a block of code, missing internal documentation tags, and indentation of continuous lines. Coding conventions, while not necessarily enforced by compilers, are important for readability of the source code and maintainability of a code base. In some customer organizations, coding conventions are formalized in a documented set of rules that an entire team or company follows.

In one embodiment, machine learning is used to discover one or more formats exhibited by the authoritative source code. In an embodiment, as a preliminary step, the source code is cleaned and reformatted so that machine learning is better able to process the source code and extract useful formatting information. In one embodiment, the computer system saves indent information, replaces existing tokens with pre-defined special identifiers, deletes indents, replaces contents with special identifiers, and replaces in-line whitespace with special identifiers. In one embodiment, the formats are derived using a recurrent neural network based language model, which associates a cell with a hidden state at each position, and updates the state with each token. In one embodiment, after processing the authoritative source code, the resulting model is evaluated for correctness. If the computer system determines that the model is sufficiently correct, additional source code can be tested against the model to reveal whether the additional source code conforms to the formats of the authoritative source code. In one embodiment, the machine learning model gives more weight to the source code that is more recently added to the repository, allowing the model to learn more effectively than existing approaches that do not use the age of the source code.

In an embodiment, the computer system receives new source code to be added to a source code repository. Prior to writing the new source code to the source code repository, the computer system determines whether the new source code complies with the formatting of the existing source code in the source code repository. If the new source code does not comply with the formatting of the existing code in the source code repository, the new source code is not written to the source code repository, and the author that submitted the new source code is notified of the failure. If the new source code does comply with the formatting of the existing source code in the source code roster, the new source code is written to the source code roster.

In an embodiment, the computer system receives an updated version of source code already in a source code repository. Prior to replacing the existing source code, the computer system determines the format of the existing source code. If the updated version of the source code does not comply with the format of the existing source code, the updated source code is not written to the source code repository and the author is notified of the failure. If the updated version of the source code does comply with the format of the existing source code, the updated source code replaces the existing source code in the source code repository.

In an embodiment, the source code document may be a text document, a formatted report, a legal document, an XML file, or a formatted data file. The system may be adapted to identify formats present in these other types of documents, and may further identify whether similar types of documents conformed to the identified formats.

FIG. 1 shows a system in accordance with one embodiment. In an embodiment, a diagram 100 illustrates a source code repository system that manages and stores source code for a number of authors. In an embodiment, a source code repository server 102 hosts a source code repository service that is accessible via a computer network. In an embodiment, the source code repository server 102 may be a computer system, computer server, server cluster, virtual computer system, or network-based processing service. In an embodiment, the source code repository server 102 includes the network interface, and the source code repository service uses the network interface to communicate with client computer systems operated by source code authors.

In an embodiment, the source code repository server 102 maintains a source code repository 104 which retains the source code. In an embodiment, the source code repository 104 is maintained on a disk drive, optical drive, flash memory, or other storage device that is connected to the source code repository server 102. In an embodiment, the source code repository 104 is a remote storage volume such as a network storage service, network attached storage device, USB-connected disk drive, or other external storage device that is accessible to the source code repository server 102. In an embodiment, the source code repository 104 retains the files of a code base. In an embodiment, the code base includes a set of code files that are capable of being compiled into a completed, executable program. In one embodiment, the source code repository 104 retains multiple versions or branches of the code base. In an embodiment, different versions or branches of the code base may represent different versions of the product or different evolutions of the code base.

In an embodiment, the source code repository server 102 is accessed by a number of code authors using client computer systems. A first client computer system 106 is used by a first author 108, a second client computer system 110 is used by a second author 112, and a third client computer system 114 is used by a third author 116. In an embodiment, the client computer systems may be tablet computers, laptop computers, network appliances, handheld devices, cell phones, or other personal computing devices. In an embodiment, a client computer system uses a network client such as a web browser to access the source code repository server 102 via a computer network. In an embodiment, an author stores an updated piece of source code on the local storage device connected to an associated client computer system. In an embodiment, the author sends the updated piece of source code to the source code repository server 102 with a request to either add the updated piece of source code to the source code repository 104, or to replace an existing piece of source code on the source code repository 104.

In an embodiment, the source code repository server 102 analyzes existing source code on the source code repository 104 and identifies a set of source code as being authoritative. In an embodiment, authoritative source code is designated as being authoritative as a result of being older, more stable, or written by more authoritative authors than other source code in the source code repository 104. The source code repository server 102 processes the authoritative source code and identifies one or more code conventions, styles, or other formats exhibited by the authoritative source code. In an embodiment, an author submits the source code to the source code repository server 102, and the source code repository server 102 examines the source code and determines whether or not the source code complies with the formats exhibited by the authoritative source code. If the source code complies with the formats exhibited by the authoritative source code, the source code repository server 102 stores the source code to the source code repository 104. If the source code does not comply with the formats exhibited by the authoritative source code, the source code repository server 102 does not store the source code to the source code repository 104, and indicates, to the respective author, that the source code is non-compliant with the formats exhibited by the authoritative source code.

Figure 2:
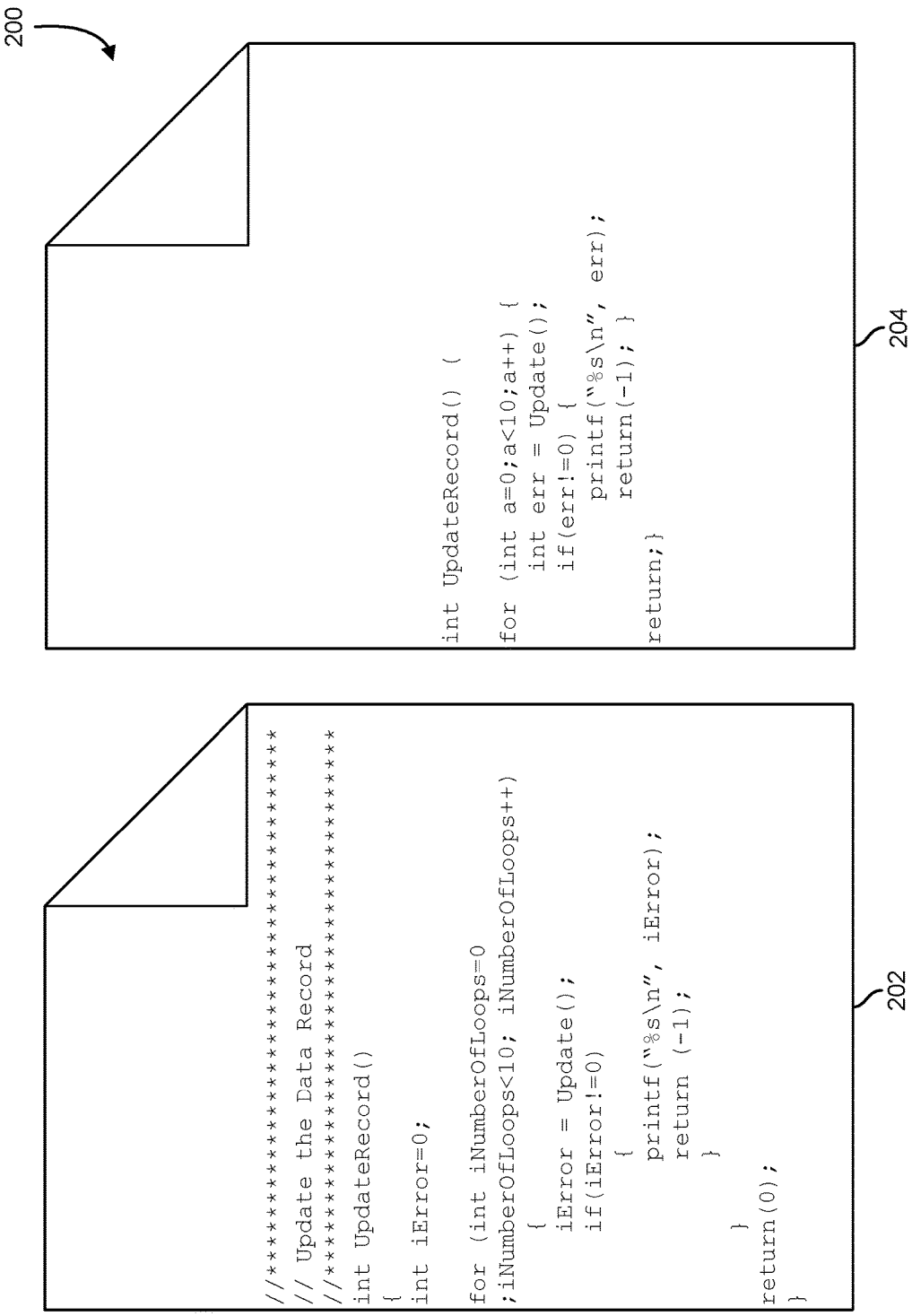
FIG. 2 shows an illustrative example of compliant and non-compliant source code in accordance with one embodiment.

FIG. 2 shows an illustrative example of compliant and non-compliant source code in accordance with one embodiment. A diagram 200 illustrates an example of source code that is compliant with the set of coding rules and source code that is not compliant with the set of coding rules. In an embodiment, a first piece of source code 202 illustrates source code that is compliant with a set of coding rules. For example, the first piece of source code 202 has a comment block before the function definition. In the first piece of source code 202, the function is named using camel case (the first character of each word is capitalized). In the first piece of source code 202, code blocks are offset with curly brackets on separate lines.

In an embodiment, a second piece of source code 204 illustrates source code that is not compliant with at least some of the coding rules exhibited by the first piece of source code 202. In an embodiment, the second piece of source code 204 does not include a comment block before the function definition. The second piece of source code 204 does not have code blocks offset with curly brackets on separate lines. As a result, the second piece of source code 204 does not exhibit the same coding rules as the first piece of source code 202.

In an embodiment, a source code repository checking service is able to identify the first piece of source code 202 as being more authoritative than the second piece of the source code 204. In an embodiment, the first piece of source code 202 is identified as being more authoritative because the first piece of source code 202 has an earlier creation date, and earlier last modification date, or an author known to be more authoritative than that of the corresponding second piece of source code 204. In an embodiment, an author may be known to be more authoritative based at least in part on author data provided by an administrator of the source code repository. In an embodiment, an author may be known to be more authoritative based at least in part on previous analysis of source code written by the author. In an embodiment, the source code repository checking service analyzes the second piece of source code 204, and is able to determine that the second piece of source code 204 does not comply with the above indicated coding rules exhibited by the first piece of source code 202. In an embodiment, as a result, the source code repository checking service will not store the second piece of source code in the source repository and may indicate to the author of the second piece of source code 204 that the code is non-compliant.

Figure 3:
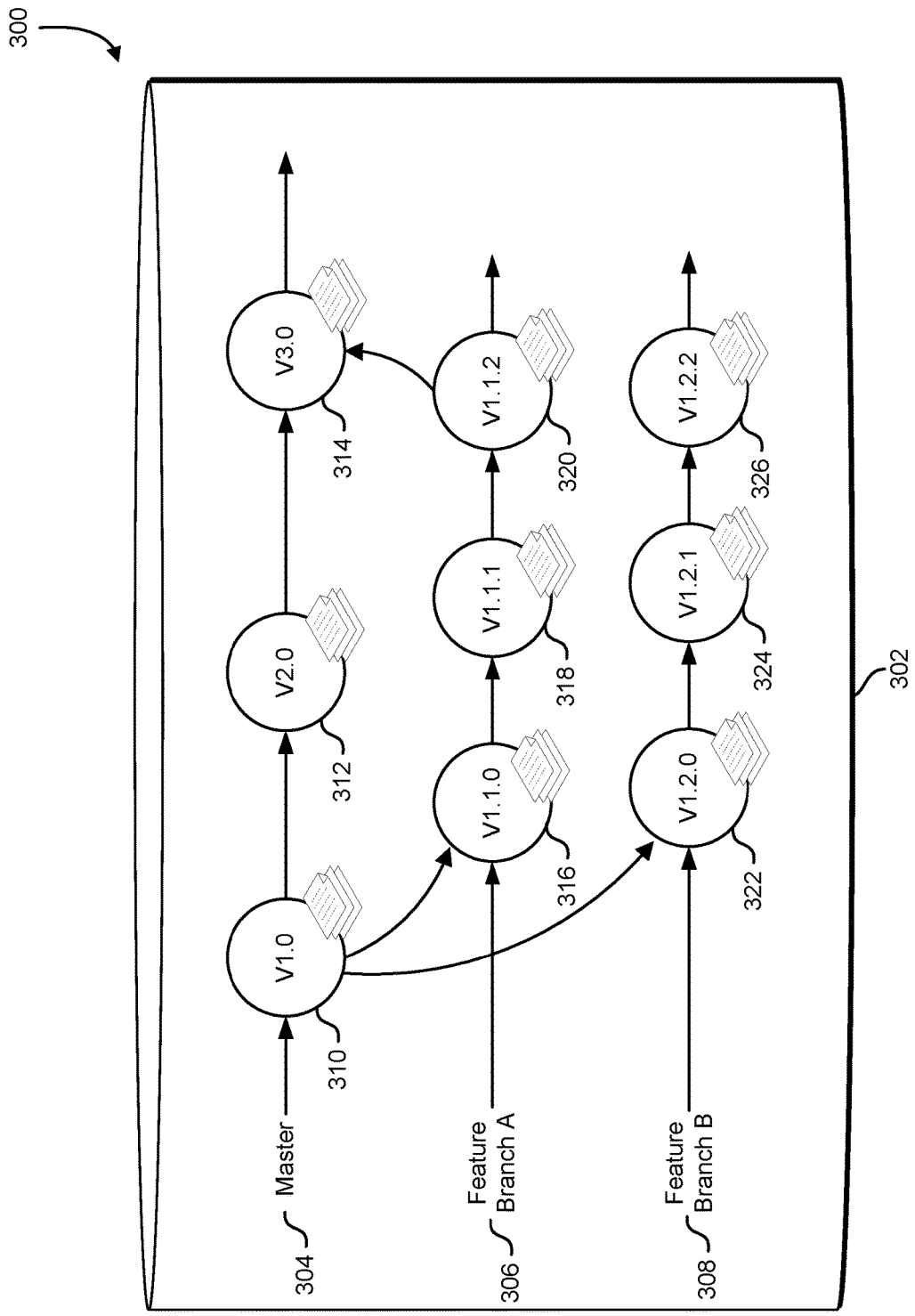
FIG. 3 shows an illustrative example of a source code repository in accordance with one embodiment.

FIG. 3 shows an illustrative example of a source code repository in accordance with one embodiment. A diagram 300 illustrates an embodiment of the source code repository 302. In an embodiment, the source code repository 302 is stored on a disk drive, optical storage device, memory device, or other storage device that is accessible to the source code management system. In an embodiment, the source code repository 302 retains a code set used to create a software product. In an embodiment, the source code management system maintains multiple versions of the source code that can be assembled to produce different versions and evolutions of the software product. In an embodiment, the source code management system contains a master branch 304, a first feature branch 306, and a second feature branch 308.

In an embodiment, the master branch 304 represents the history of the primary releases produced by the programming team. The master branch 304 includes a first main version 310, a second main version 312, and a third main version 314. In an embodiment, each version on the master branch 304 can be compiled by a build system to produce a corresponding version of the software product. Feature branches are often used by subgroups or other teams to develop additional features and functionality. By using a feature branch, development can occur separate from the main branch, isolating other programmers from turmoil associated with integrating the substantial new functionality. In an embodiment, the first feature branch 306 includes a first feature version 316, a second feature version 318, and a third feature version 320. In an embodiment, a feature team executes a branch by copying the first main version 310 to the first feature version 316. In an embodiment, the feature team can then work within the feature team generating the second feature version 318 and the third feature version 320. In an embodiment, the feature team stabilizes the feature with the third feature version 320, and the third feature version 320 is merged with the third main version 314 to produce a main branch version containing the feature.

In an embodiment, other feature branches may be used in parallel. In an embodiment, the second feature branch 308 is generated from the first main version 310 by copying the first main version 310 to the first version of the second feature branch 322. In an embodiment, the second feature branch 308 includes additional feature versions 324 and 326. The second feature branch 308 may be merged with the first feature branch 306, or the master branch 304, as desired by the development team. In an embodiment, the source code management system uses the source code repository 302 to maintain a version history of the code base. In an embodiment, the source code management system enables the development teams to work in parallel, merging their respective features into a common code branch. In an embodiment, the additional code convention checking service ensures that separate teams working on isolated branches generate code that conforms to common coding rules.

Figure 4:
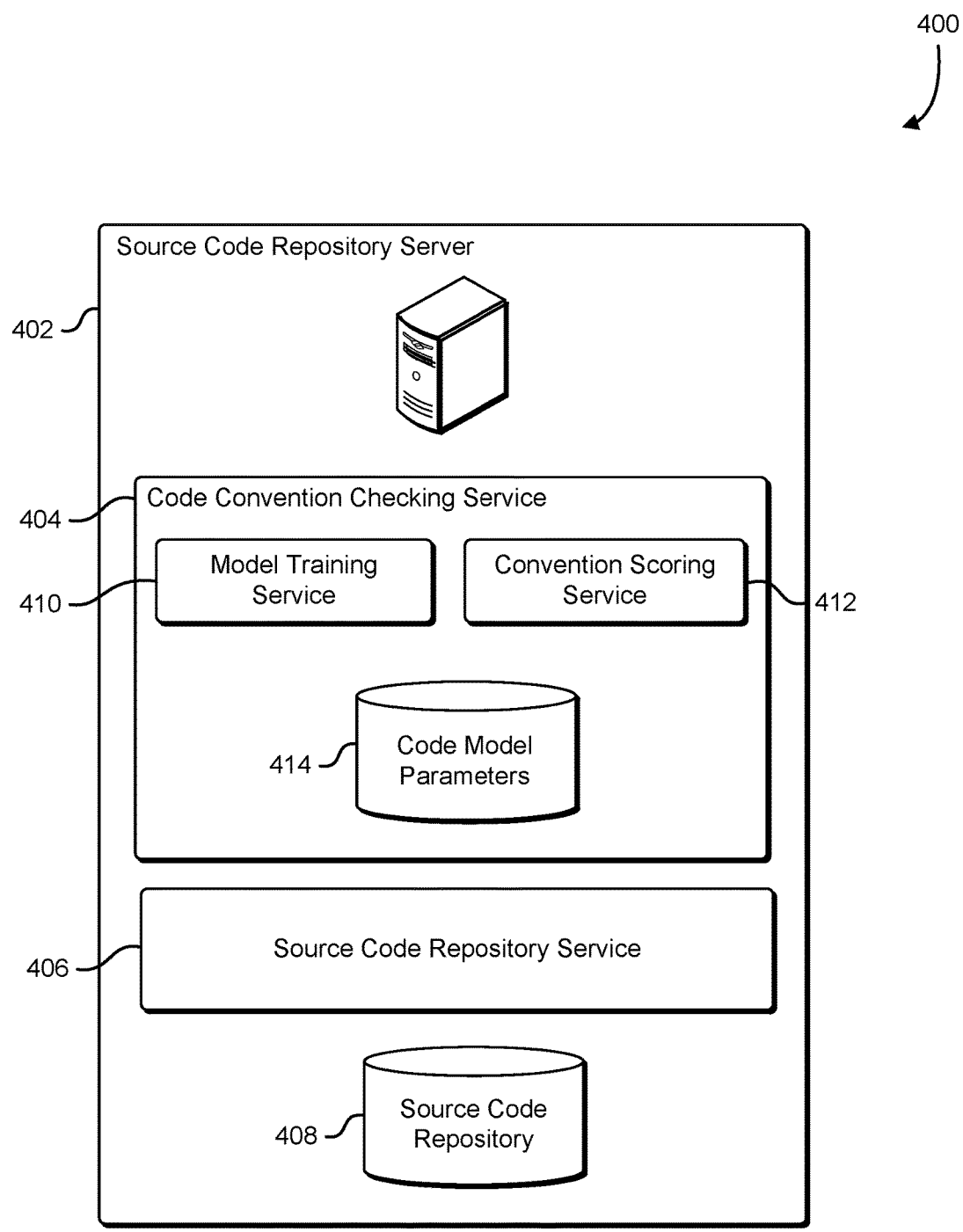
FIG. 4 shows an illustrative example of a source code repository server in accordance with one embodiment.

FIG. 4 shows an illustrative example of a source code repository server in accordance with one embodiment. A system diagram 400 illustrates an embodiment of a source code repository server 402. In an embodiment, the source code repository server 402 is a computer system, computer server, server cluster virtual computer system, or other processing device that hosts a code convention checking service 404 and a source code repository service 406. In an embodiment, the source code repository server 402 includes a source code repository 408. In an embodiment, the source code repository is a disk drive, optical drive, memory, or other storage device used by the source code repository server 402 to retain source code information maintained by the source code repository service 406. In an embodiment, the source code repository service 406 is a set of executable instructions that run on the source code repository server 402 which, when executed, manage the source code repository 408. In an embodiment, the source code repository 408 is arranged as shown in FIG. 3.

In one embodiment, the code convention checking service 404 includes a model training service 410 and a convention scoring service 412. In one embodiment, the model training service 410 communicates with the source code repository service 406 to identify a set of authoritative source code in the source code repository 408. In one embodiment, after identifying the set of authoritative source code, the code convention checking service 404 processes the set of authoritative source code using the model training service 410 to produce a set of code model parameters 414. In one embodiment, the set of code model parameters 414 includes a set of parameters that control the machine learning model. In one embodiment, the set of parameters describes a recurrent neural network language model. In one embodiment, the model training service 410 confirms the correctness of the model, and after the correctness of the model has been confirmed, the code convention checking service 404 is capable of checking non-authoritative source code for conformance to the identified format rules.

In one embodiment, the code convention checking service 404 invokes the convention scoring service 412 to confirm that a non-authoritative piece of source code conforms with the coding rules detected in the authoritative source code. In one embodiment, non-authoritative source code is submitted to the code convention checking service 404 by an author from a client computer system via a computer network. In one embodiment, non-authoritative source code is retrieved from the source code repository 408 using the source code repository service 406. In one embodiment, the convention scoring service 412 uses the code model parameters 414 to configure a recurrent neural network language model. In one embodiment, the recurrent neural network language model is used to determine the degree of compliance of the non-authoritative source code. In one embodiment, the code convention checking service 404 indicates to the author whether or not the non-authoritative source code is compliant. In one embodiment, the code convention checking service 404 submits the code to the source code repository service 406 to be stored in the source code repository 408 if the non-authoritative source code is found to be compliant. In one embodiment, if the non-authoritative source code is found to be non-compliant, the code convention checking service 404 does not submit the non-compliant source code to the source code repository service 406, and the code convention checking service 404 notifies the author that the non-authoritative source code is non-compliant.

Figure 5:
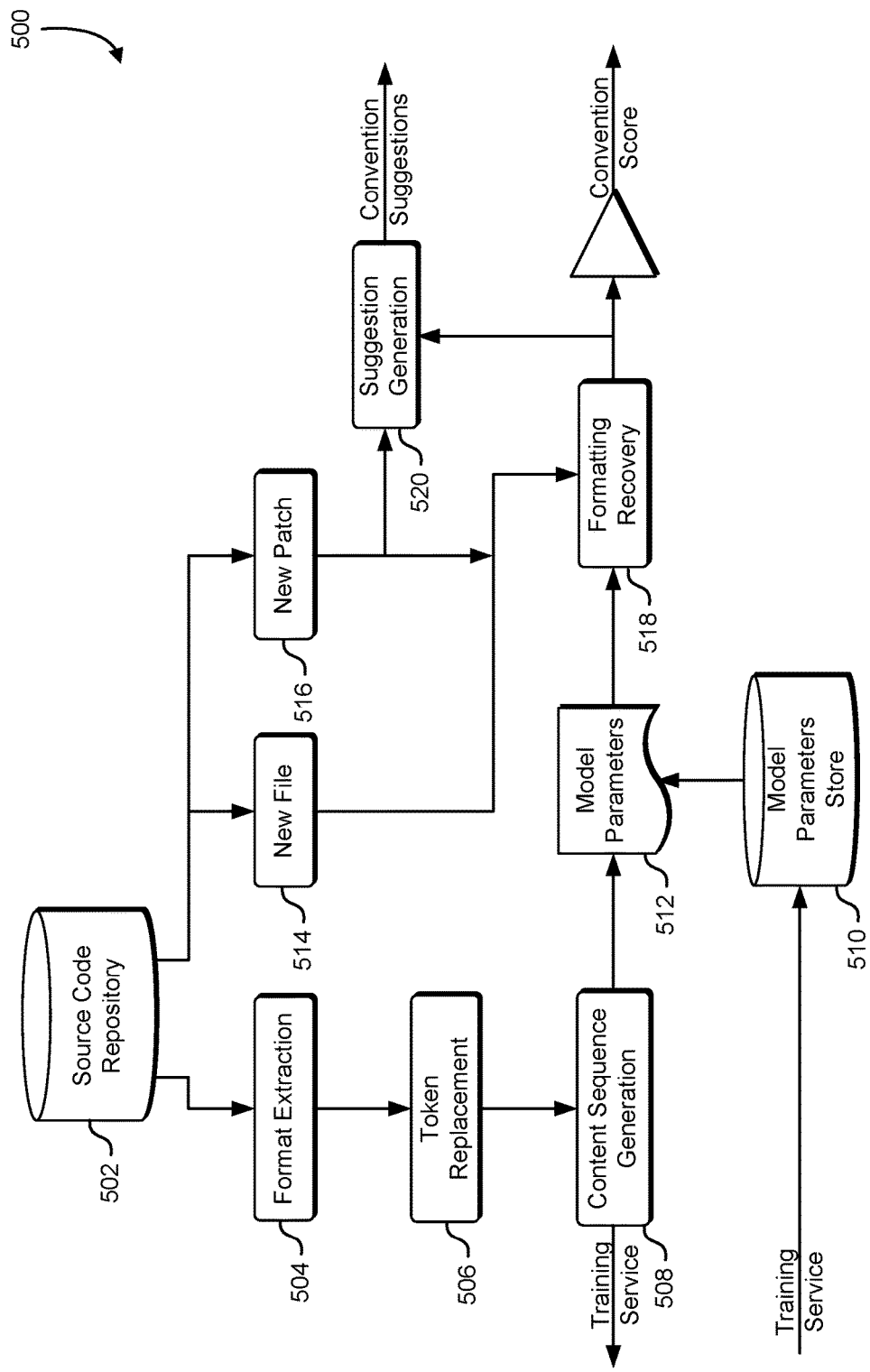
FIG. 5 shows an illustrative example of a code convention checking service in accordance with one embodiment.

FIG. 5 shows an illustrative example of a code convention checking service in accordance with one embodiment. In an embodiment, a diagram 500 illustrates a process flow used by a code convention checking service. In an embodiment, the code convention checking service is called when a developer submits his/her code for evaluation prior to being accepted into a branch of source code maintained in a source code repository 502. In an embodiment, the input to the code convention checking service is the new source code file or source code patch to be evaluated. In an embodiment, the output of the code convention checking service is a score and one or more convention suggestions for each positions of interest (or every position where the actual token of the source code under test surprises the model generated by processing the authoritative source code).

In an embodiment, before the code convention checking service is able to evaluate non-authoritative source code, the code convention checking service identifies authoritative source code from the source code repository 502 and prepares the authoritative source code for processing by a machine learning task. In an embodiment, the authoritative source code is fed into a format extraction service 504. In an embodiment, the format extraction service 504 transforms the authoritative source code into an intermedia file. The intermedia file is a list of tokens with special identifiers indicating the formatting information of the associated source code. In an embodiment, the format extraction service 504 saves the indent information by counting the number of spaces and tabs at the beginning of each line of the source code file, replaces existing tokens with predefined special characters, deletes the indent of each line of the source code file, replaces comments with identifiers, and replaces all in-line white space with identifiers. In an embodiment, the token list is then filtered by a token replacement service 506. In an embodiment, the resulting token sequences are transformed into token sequences having a fixed length by a content sequence generation service 508.

In an embodiment, a training service processes the authoritative source code to produce a set of model parameters 512 which are stored in a model parameter store 510. In an embodiment, the training service utilizes a deep learning model that is based at least in part on a recurrent neural network ("RNN") language model. In an embodiment, as the training service refines the model parameters 512, the model is evaluated to determine whether the model is sufficiently accurate to be used in evaluating non-authoritative source code. In one embodiment, as the training service processes authoritative source code, the model learns coding conventions and coding rules by processing files that include positive samples (correct token sequences generated by processing authoritative source code). In an embodiment, as the training service processes the authoritative source code files, each token processed is regarded by the code convention checking service as correct output of its previous token sequence. As a result, the evaluation provides a "high score" to those predictions which are close to their targets and "low scores" otherwise.

In an embodiment, the model is evaluated to determine whether the model parameters 512 are sufficiently correct to begin processing non-authoritative source files. In an embodiment, the model is evaluated using 10-fold cross-validation (https://en.wikipedia.org/wiki/Cross-validation_(statistics)#k-fold_crossvalidation). In an embodiment, the training tokens are randomly partitioned into ten equal-sized sub lists. Of the ten sub samples, a single sub list is retained as the validation data for testing the model, and the remaining nine sub lists are used as training data. In an embodiment, two metrics are selected to validate the model. The first metric is the F1 score, which is a measurement of accuracy. The second metric is perplexity, which represents how confused the model is. The F1 score is calculated based at least in part on a confusion matrix. If the model parameters 512 indicate that the model is sufficiently developed, the code convention checking service begins evaluating non-authoritative source code.

Figure 7:
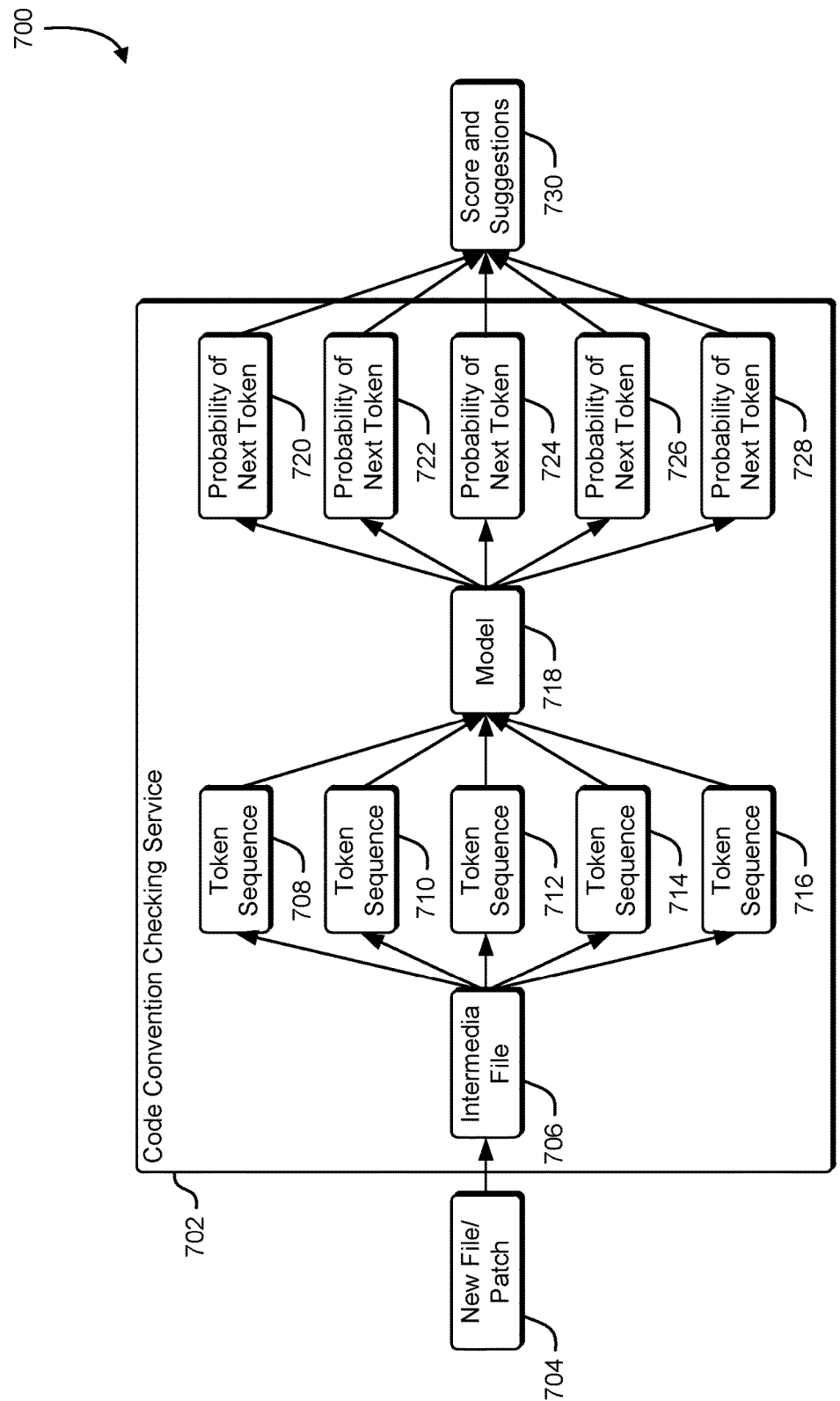
FIG. 7 shows an illustrative example of a code convention checking process flow in accordance with one embodiment.

In an embodiment, the code convention checking service may process new source code files 514 or source code patches 516 that modify existing source files and source code repository 502. A formatting recovery service 518 processes the input source code to produce a token sequence which is processed using history-based training, and the code convention checking service predicts the probability distribution of the next token of the input source code. In an embodiment, each token in the file or patch is treated as a "next token." In an embodiment, the feedback to the developer is based at least in part on the probability information. An example of this process is illustrated in FIG. 7.

In an embodiment, for each token in the new snippet/patch, a suggestion generation service 520 uses the model to produce a list of suggestions and a perplexity for the snippet/patch. In an embodiment, if the perplexity is very low and the actual token matches the top suggestion, the code convention checking service assigns a 1 to this token. In an embodiment, if the perplexity is very low and the actual token doesn't match the top suggestion, the code convention checking service assigns a 0 to the token. For predictions with other perplexity, a proportional score is assigned.

Figure 6:
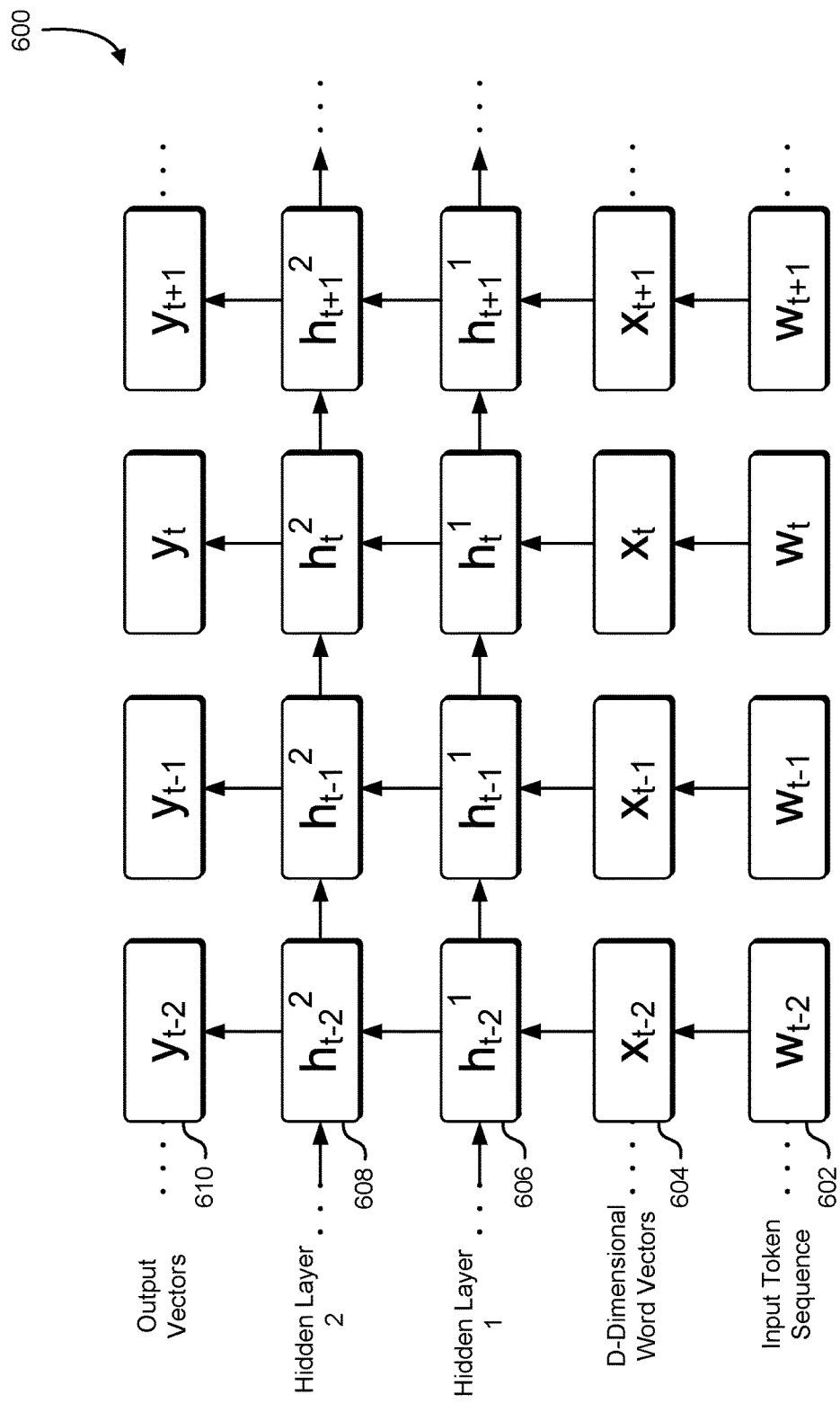
FIG. 6 shows an illustrative example of a recurrent neural network ("RNN") language model in accordance with one embodiment.

FIG. 6 shows an illustrative example of a recurrent neural network ("RNN") language model in accordance with one embodiment. A diagram 600 illustrates the operation of a recurrent neural network language model in accordance with an embodiment. In an embodiment, use of a recurrent neural network language model enables the system to consider dependencies that exceed a given window size. In an embodiment, a recurrent neural network based language model associates a cell with a hidden state at each position and updates the state with each token. In an embodiment, memory cells such as long short-term memory ("LSTM") and gated recurrent units ("GRU") may be used for language modeling tasks. In some embodiments, models such as tree-based LSTMs may be used. In an embodiment, the recurrent neural network language model includes an input token sequence 602, a set of D-dimensional word vectors 604, a first hidden layer 606, a second hidden layer 608, and a set of output vectors 610.

In an embodiment, the recurrent neural network makes use of the hidden layer output $h_{(t-1)}$ on the last time step (t-1) to capture the influence of previous tokens in the input stream.

$$h_t = \sigma(W^{(hh)} h_{(t-1)} + W^{(hx)} x_t)$$

$$y_t = \text{softmax}(W^{(S)} h_t)$$

In the example above, $x_t$ is the input word vector at time t; $W^{(hh)}$, $W^{(hx)}$, and $W^{(S)}$ are weight matrices with different dimensions; and sigma( ) and softmax( ) add nonlinearity to the network. In an embodiment, the output $y_t$ at each time step t is the next predicted word given the document context score so far (i.e. $h_{(t-1)}$) and the last observed word vector $x_t$. The embodiment illustrated in FIG. 6 illustrates an example of a conventional RNN with two hidden layers. In an embodiment, the machine learning model uses a cross entropy error over the input stream of size T.

$$J = -1/T \sum_{(t=1)}^{T} J(t)\theta = -1/T \sum_{(t=1)}^{T} \sum_{(j=1)}^{(|V|)} y(t, j) X \log(t_{(t,j)})$$

In the example above, $y_{(t,j)}$ is the jth element in the output vector at time t. Taking 2 to the power of loss J, we have the perplexity (http://planspace.org/2013/09/23/perplexity-what-it-is-and-what-yours-is/) relationship (Perplexity=$2^J$) which measures the confusion of the prediction. The lower the value, the more confidence the model has.

In an embodiment, LSTM may be introduced by using a more complex activation unit. In an embodiment, by introducing LSTM "exploding and vanishing gradients" are avoided resulting in improved training. LSTM is designed in a way to have a more persistent memory, thereby capturing long-term dependency more easily.

$$i_t = \sigma(W^{(i)} x_t + U^{(i)} h_{t-1})$$

Input gate $f_t = \sigma(W^{(f)} x_t + U^{(f)} h_{t-1})$

Forget gate $o_t = \sigma(W^{(o)} x_t + U^{(o)} h_{t-1})$

Output/Exposure gate $\bar{c}_t = \tanh(W^{(c)} x_t + U^{(c)} h_{t-1})$

New memory cell $c_t = f_t \cdot c_{t-1} + i_t \cdot \bar{c}_t$

Final memory cell $h_t = o_t \cdot \tanh c_t$

In the above example, $W^s$ and $U^s$ are different weight matrices. In an embodiment, the first four equations have matching input which is a combination of affine transformation of both $x_t$ and $h_{t-1}$. In an embodiment, the difference appears in the parameters of the affine functions and the choice of nonlinearity. In an embodiment, the final memory cell takes the advice of a forget gate, $f_t$ and accordingly forgets the past memory, $c_{t-1}$. In an embodiment, the final memory cell takes the advice of the input gate, $i_t$ and accordingly gates the new memory, $\bar{c}_t$. In an embodiment, if the forget gate is close to 0, the previous memory cell is ignored, which means that the model drops the past information that is not relevant. In an embodiment, if the input gate is close to 0, the model indicates that the new memory cell, which takes into account aspects of the incoming word $\Omega_t$, is not preserved. In an embodiment, the model uses the output from the output/exposure gate $o_t$ to determine how much the elements in final memory $c_t$ are necessarily required for current hidden layer $h_t$. An example of this structure is illustrated at (http://colah.github.io/posts/2015-08-Understanding-LSTMs/).

FIG. 7 shows an illustrative example of a code convention checking process flow in accordance with one embodiment. A diagram 700 illustrates an embodiment of a process performed by a code convention checking service 702. In an embodiment, a new source code file or patch 704 to an existing source code file is submitted to the code convention checking service 702. In an embodiment, the code convention checking service 702 processes the input source code to produce an intermedia file 706. In an embodiment, the intermedia file 706 is processed into a number of token sequences 708, 710, 712, 714, and 716. In an embodiment, the token sequences are fed into a model 718 generated using history-based training of authoritative source code.

In an embodiment, the code convention checking service 702 processes token sequences using history-based training and produces probability distributions 720, 722, 724, 726, and 728 for each of the next tokens in the input source code. In an embodiment, the probability distributions 720, 722, 724, 726, and 728 are used to generate a score and a set of suggestions 730. In an embodiment, the score is based on a proportion of predicted tokens that match the actual tokens in the input source code. In an embodiment, when the predicted token does not match the actual token in the input source code, a suggestion is provided to the author based on the predicted token.

Figure 8:
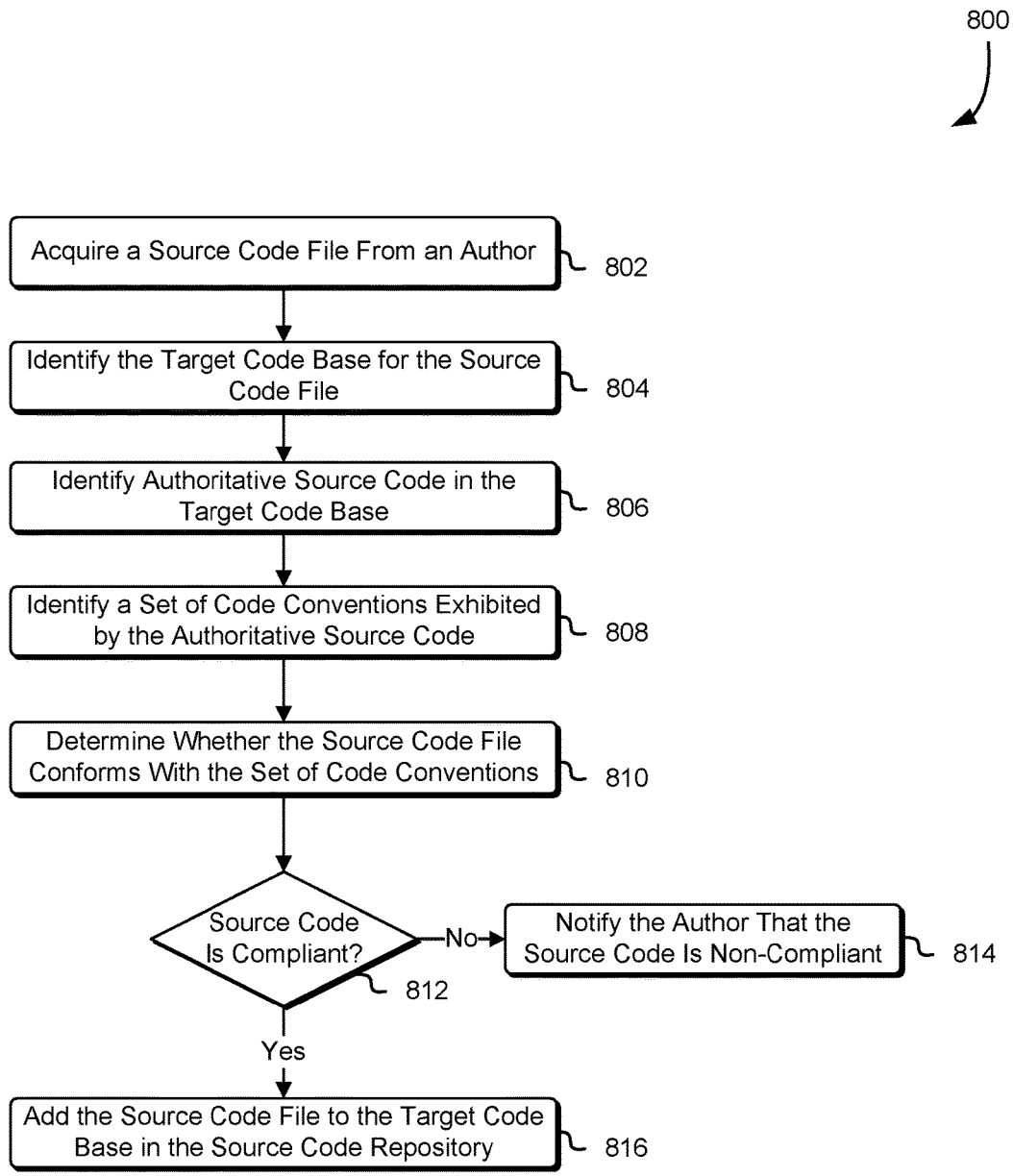
FIG. 8 shows an illustrative example of a process in accordance with one embodiment.

FIG. 8 shows an illustrative example of a process in accordance with one embodiment. In an embodiment, a flowchart 800 illustrates a process that begins at block 802 with a code convention checking service acquiring a source code file from an author. In an embodiment, the source code may be provided by a client computer system operated by the author. In an embodiment, the source code may be provided by a build management computer system operated by the author or a designated build management technician. In an embodiment, at block 804, the code convention checking service identifies a target code base for the source code file. In an embodiment, the target code base is a set of code maintained in a source code repository to which the source code is to be added. In an embodiment, at block 806, the code convention checking service examines the target code base and identifies authoritative source code within the target code base. In an embodiment, the authoritative code is identified based on the age, stability, or authorship of individual pieces of source code in the target code base. In an embodiment, at block 808, the code convention checking service processes the authoritative source code using the machine learning model and identifies a set of code conventions exhibited by the authoritative source code.

In an embodiment, the code convention checking service maintains a database of potential code conventions and coding rules, and processes the authoritative source code against each of the potential code conventions and coding rules. In an embodiment, the code convention checking service determines whether each rule is applicable to the authoritative source code or not by determining whether the authoritative source code violates each rule. In an embodiment, the code convention checking service determines the set of coding rules as the set of rules with which the authoritative code complies.

In one embodiment, at block 810, the code convention checking service determines whether the source code provided by the author conforms to the set of code conventions and coding rules identified from the authoritative source code. At decision block 812, if the source code supplied by the author does not comply with the code conventions and coding rules identified by the code convention checking service, execution advances to block 814. If the source code supplied by the author complies with the code conventions and coding rules identified by the code convention checking service, execution advances to block 816. At block 814, in an embodiment, the code convention checking service notifies the author that the source code is non-compliant. In an embodiment, as a result of the source code being non-compliant, the code convention checking service does not add the source code to the target code base. At block 816, in an embodiment, as a result of having determined that the code is compliant with the code conventions and coding rules, the code convention checking service adds the source code file to the target code base in the source code repository.

Figure 9:
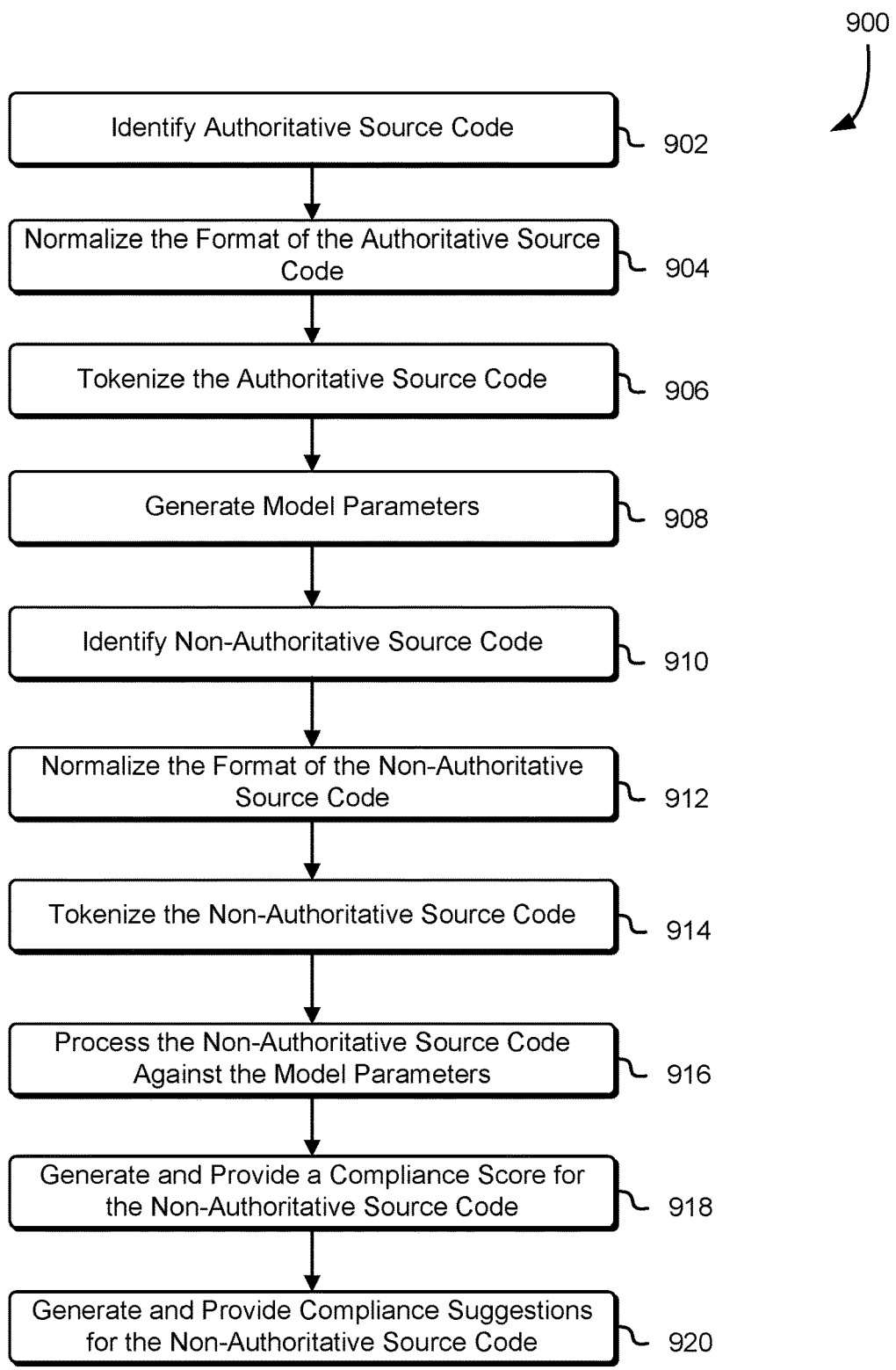
FIG. 9 shows an illustrative example of a process in accordance with one embodiment.

FIG. 9 shows an illustrative example of a process in accordance with one embodiment. A flowchart 900 illustrates an embodiment of a process that begins a block 902 with a code convention checking service identifying authoritative source code within a set of source code files. In an embodiment, the set of source code files is a named code release and a source code repository. In an embodiment, at block 904, the code convention checking service normalizes the format of the authoritative source code, in an embodiment, the format of the authoritative source code is normalized by replacing tabs with the equivalent spaces, removing excess basis, removing excess white space, removing excess blank lines, and replacing comments with tokens. In an embodiment, at block 906, the code convention checking service tokenizes the normalized authoritative source code by converting language elements to standard tokens. In an embodiment, at block 908, the resulting token stream is processed using machine learning to generate a set of model parameters. In an embodiment, the model parameters describe the set of coding rules and code conventions adhered to by the authoritative source code.

In an embodiment, at block 910, the code convention checking service identifies non-authoritative source code from the set of source code files. In an embodiment, non-authoritative source code files are provided by an author for additions to the set of source code files. In an embodiment, at block 912, the non-authoritative source code files are normalized using a process similar to that used when normalizing the authoritative source code. At block 914, in an embodiment, the code convention checking service produces a token stream from the normalized non-authoritative source code. In an embodiment, the token stream is processed 916 using the model parameters generated by processing the authoritative source code. In an embodiment, the code convention checking service produces a set of probabilities that indicate whether or not the sequence of tokens in the non-authoritative code indicate compliance with the coding rules used to generate the model.

In an embodiment, at block 918, the code convention checking service generates a score for the non-authoritative source code that indicates a level of compliance with the coding rules identified at block 908. In one embodiment, the score is based on a fraction of code that is compliant with the identified coding rules. In one embodiment, the score is based on the number of deviations from the coding rules. At block 920, in an embodiment, the code convention checking service generates compliance suggestions for the non-authoritative code. In an embodiment, the code convention checking service indicates an expected token that is not present in the non-authoritative source code. In an embodiment, the code convention checking service identifies a particular format rule that is not adhered to by the non-authoritative code.

Figure 10:
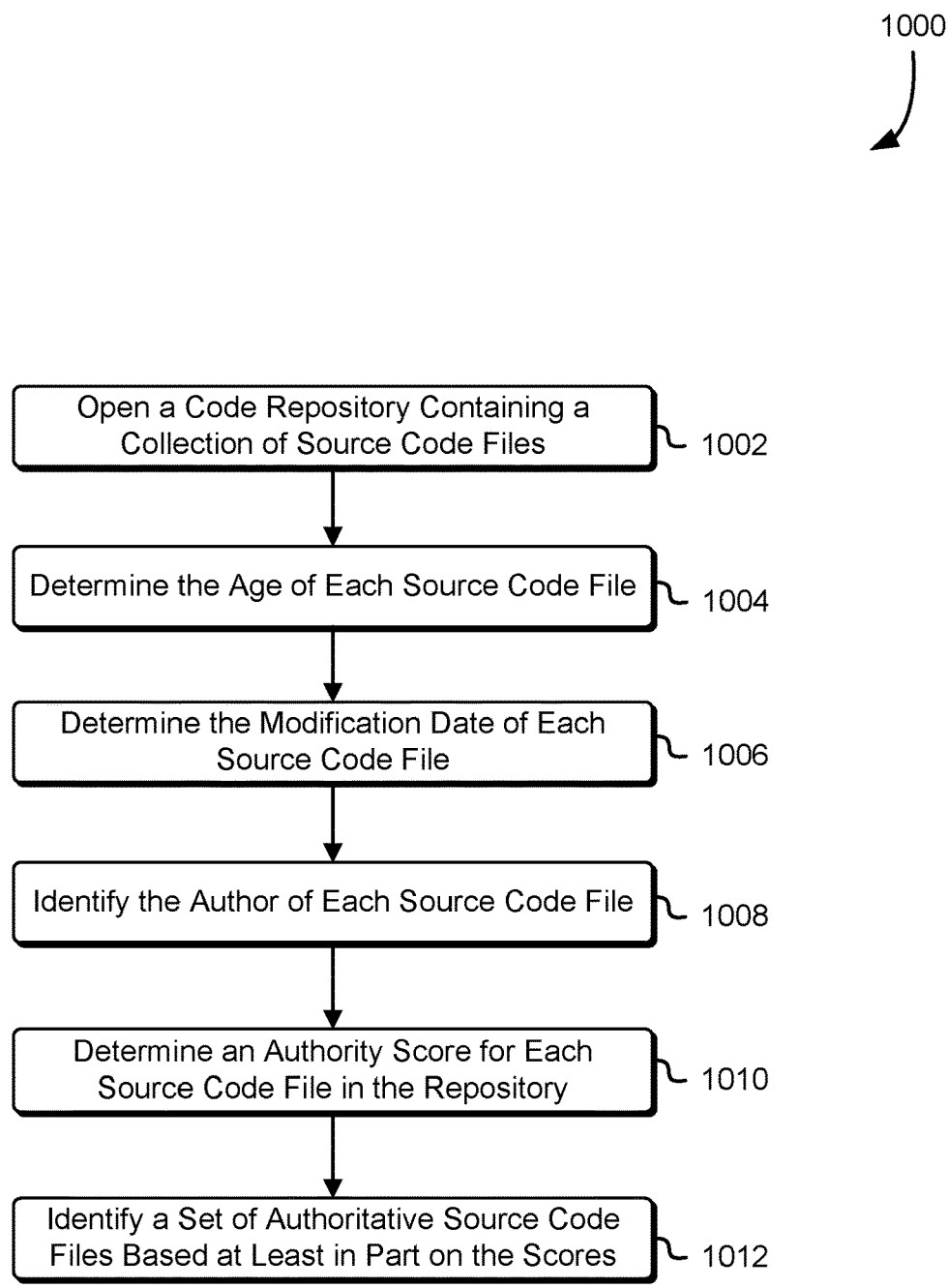
FIG. 10 shows an illustrative example of a process in accordance with one embodiment.

FIG. 10 shows an illustrative example of a process in accordance with one embodiment. A flowchart 1000 illustrates an embodiment of a process for identifying an authoritative source code that begins at block 1002. In an embodiment, at block 1002, the code convention checking service opens a source code repository containing a collection of source code files. In an embodiment, the source code repository contains a code base that includes a plurality of source code files used to build the software product. In an embodiment, at block 1004, the code convention checking service determines the age of each source code file in the collection of source code files. In an embodiment, the age of each source file is determined based on the file creation date of each source file. In an embodiment, the age of each source file is determined based on when the source code file was first stored in the source code repository. In an embodiment, the code convention checking service identifies pieces of source code from within individual source code files to use as examples of authoritative source code. In an embodiment, a source code repository maintains a code base that includes a plurality of files, and the source code repository identifies origin and modification dates for various portions of each source file. At block 1006, in an embodiment, the code convention checking service determines the modification date of each source code file in the source code repository. In an embodiment, the modification date of each source code file is determined by the most recent modification date of each file. In an embodiment, the modification date of each source code file is determined by the time of the last update to the source code file in the source code repository.

In an embodiment, at block 1008, the code convention checking service identifies an author associated with each source code file. In an embodiment, the author associated with each source code file is acquired by querying the source code repository, and a source code repository service identifies the author that stored the source code in the source code repository. At block 1010, in an embodiment, the code convention checking service determines an authority score for each source code file. In an embodiment, the authority score is based at least in part on the age, modification date, and authorship of each respective file. In an embodiment, the code convention checking service maintains a database of authors and respective authority score modifiers. In an embodiment, when determining a score for a particular piece of source code, the score of the author of the source code is added to a base score that is determined using a combination of the age and modification date of the file.

In an embodiment, at block 1012, the code convention checking service identifies a set of authoritative source code files based at least in part on the scores associated with each file. In an embodiment, the code convention checking service designates as authoritative those files having a score that exceeds a threshold set by an administrator of the source code repository. In an embodiment, the code convention checking service designates as authoritative a given percentile of the source code files having the highest respective scores, where the percentile is defined by an administrator of the source code repository.

Figure 11:
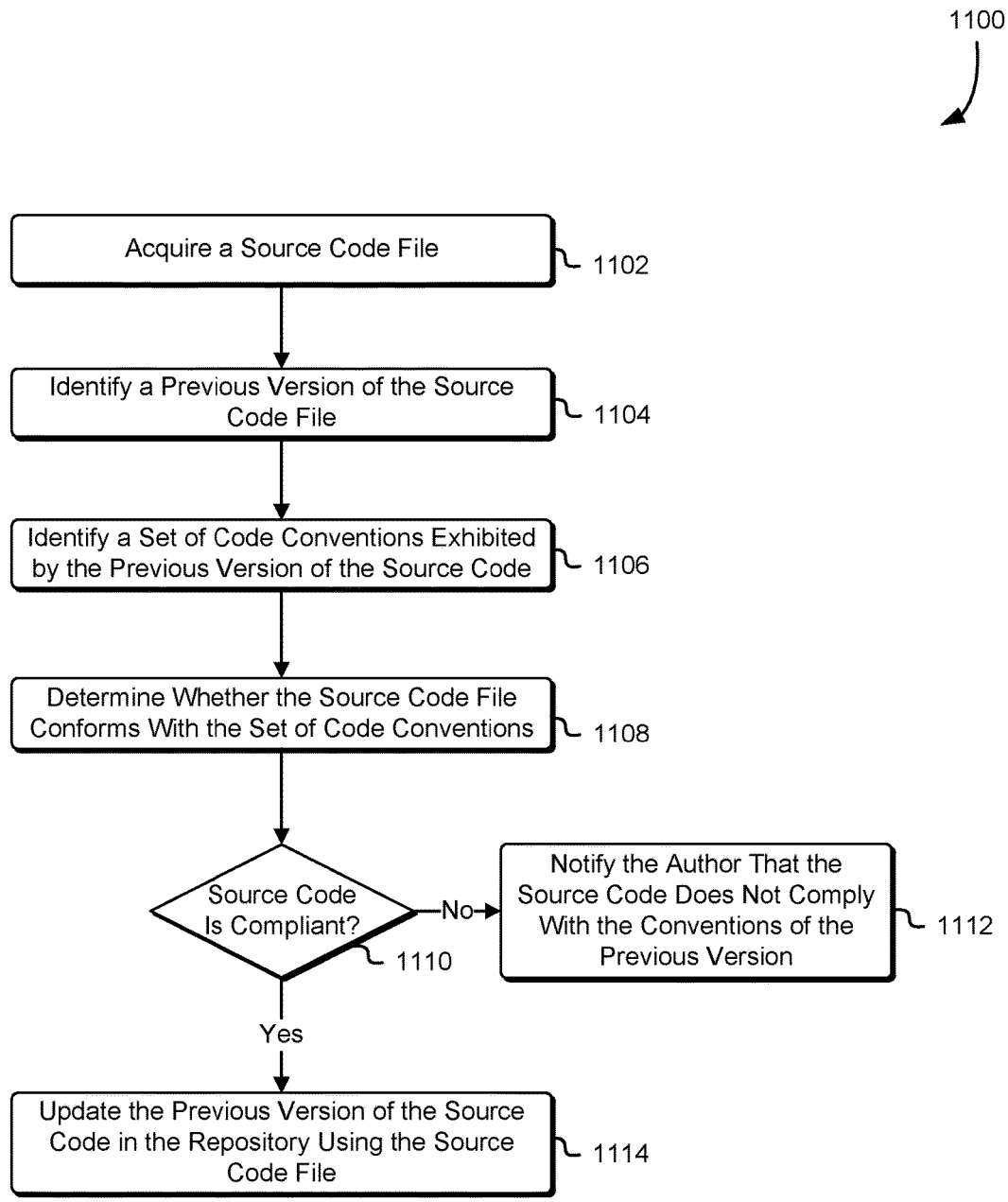
FIG. 11 shows an illustrative example of a process in accordance with one embodiment.

FIG. 11 shows an illustrative example of a process in accordance with one embodiment. A flowchart 1100 illustrates an embodiment of a process that, when performed by a code convention checking service, processes and updates to a source code file in a source code repository. In an embodiment, at block 1102, the source code convention checking service acquires, from an author, a source code file to be added to a source code repository. In an embodiment, at block 1104, the code convention checking service examines the source code repository and identifies a previous version of the source code file presently in the source code repository. In an embodiment, the code convention checking service processes 1106 the previous version of the source code to identify a set of code conventions exhibited by the previous version of the source code.

In an embodiment, at block 1108, the code convention checking service examines the source code file provided by the author, and determines whether or not the source code file provided by the author conforms to the set of code conventions exhibited by the previous version. In an embodiment, at decision block 1110, if the source code file does not conform to the set of code conventions exhibited by the previous version, execution advances to block 1112. In an embodiment, at block 1112, the code convention checking service notifies the author that the source code does not comply with the conventions of the previous version of the source code. In an embodiment, at block 1112, the source code in the source code repository is not updated using the source code submitted by the author.

In an embodiment, if the source code file conforms to the set of code conventions exhibited by the previous version, execution advances to block 1114. In an embodiment, as a result of determining that the source code conforms to the set of code conventions exhibited by the previous version, the source code in the source code repository is updated using the source code provided by the author.

Figure 12:
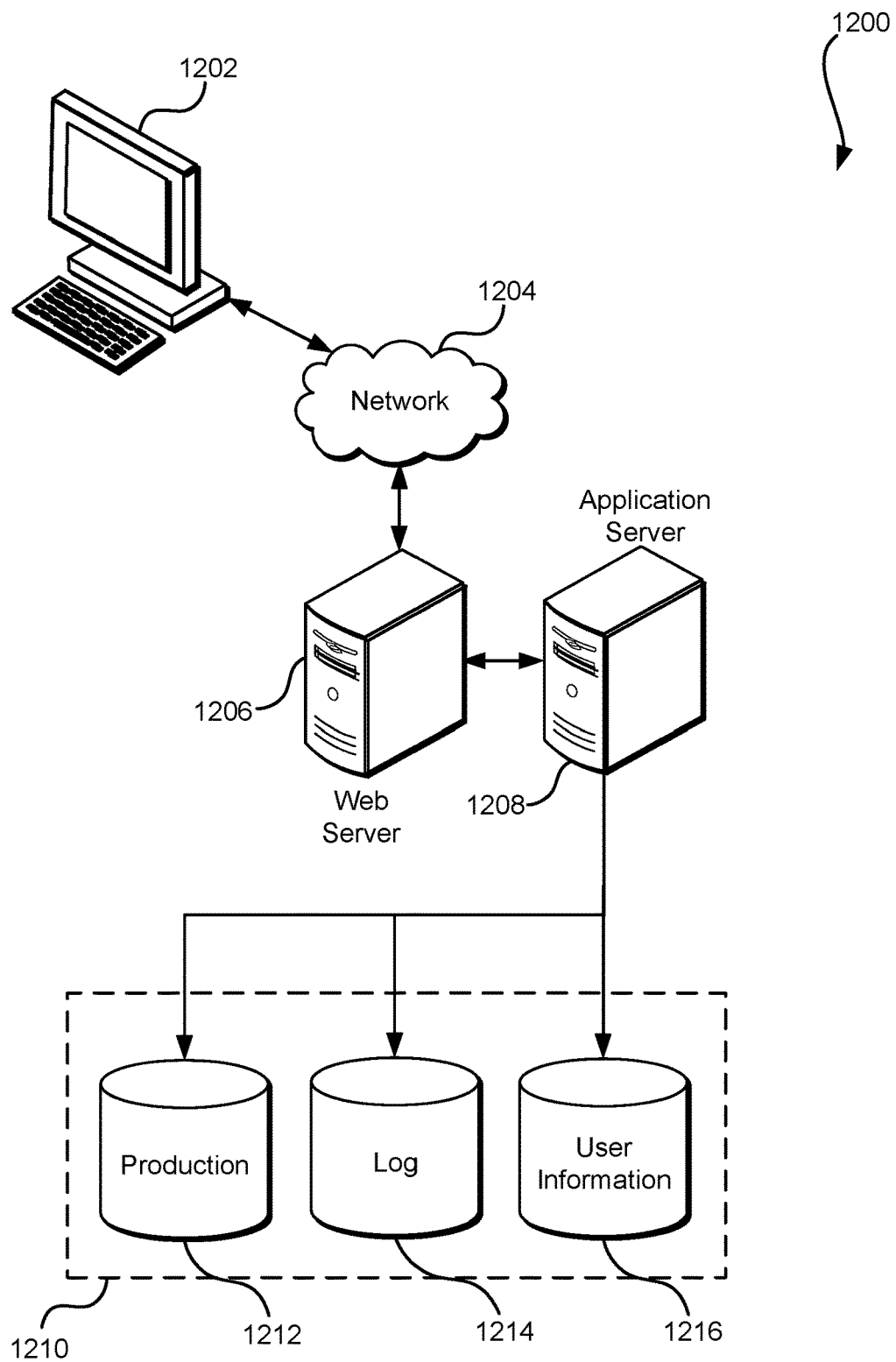
FIG. 12 illustrates an environment in which various embodiments can be implemented.

FIG. 12 illustrates a system 1200 for implementing aspects in accordance with one embodiment. In one embodiment, a web-based system is used. The system includes an electronic client device 1202, which can include any appropriate device operable to send and/or receive requests, messages, or information over an appropriate network 1204 and, in one embodiment, convey information back to a user of the device. In one embodiment, client devices include personal computers, cell phones, handheld messaging devices, laptop computers, tablet computers, set-top boxes, personal data assistants, embedded computer systems, electronic book readers, and the like. In one embodiment, the network includes any appropriate network, including an intranet, the Internet, a cellular network, a local area network, a satellite network, or any other such network and/or combination thereof. In one embodiment, components used for such a system can depend at least in part on the type of network and/or system selected. In one embodiment, communication over the network can be enabled by wired or wireless connections and combinations thereof. In one embodiment, the network includes the Internet and/or publicly addressable communications network, as the system includes a web server 1206 for receiving requests and serving content in response thereto. In one embodiment, an alternative device serving a similar purpose is used for other networks.

In one embodiment, the illustrative system includes at least one application server 1208 and a data store 1210. In one embodiment, there are several application servers, layers, or other elements, processes, or components, which may be chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In one embodiment, the application server can include any appropriate hardware, software, and firmware that integrates with the data store as needed to execute aspects of one or more applications for the client device, handling some or all of the data access and business logic for an application. In one embodiment, the application server provides access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In one embodiment, content transferred to a client device is processed by the client device to provide the content in one or more forms including, but not limited to, forms that are perceptible to the user audibly, visually, and/or through other senses. In one embodiment, the handling of requests and responses, and the delivery of content between the client device 1202 and the application server 1208, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In one embodiment, the data store 1210 includes several separate data tables, databases, data documents, dynamic data storage schemes, and/or other data storage mechanisms and media for storing data relating to a particular aspect of the present disclosure. In one embodiment, the data store illustrated includes mechanisms for storing production data 1212 and user information 1216, which can be used to serve content for the production side. In one embodiment, the data store is shown to include a mechanism for storing log data 1214, which can be used for reporting, analysis, or other such purposes. In one embodiment, other aspects may be stored in the data store, such as page image information and access rights information, which can be stored in any of the above listed mechanisms as appropriate or in additional mechanisms in the data store 1210. In one embodiment, the data store 1210 is operable, through logic associated therewith, to receive instructions from the application server 1208 and obtain, update, or otherwise process data in response thereto. In one embodiment, the application server 1208 provides static, dynamic, or a combination of static and dynamic data in response to the received instructions. In one embodiment, dynamic data, such as data used in web logs (blogs), shopping applications, news services, and other such applications is generated by server-side structured languages as described herein or may be provided by a content management system ("CMS") operating on, or under the control of, the application server. In one embodiment, a user, through a device operated by the user, submits a search request for a certain type of item, and the data store accesses the user information to verify the identity of the user and can access the catalog detail information to obtain information about items of that type, and then the information is returned to the user. In one embodiment, the information is returned as a results listing on a web page that the user is able to view via a browser on the client device 1202. In one embodiment, information for a particular item of interest is viewed in a dedicated page or window of the browser. The present disclosure is not limited to the context of web pages, and may be applicable to processing requests in general where the requests are not requests for content.

In one embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing system utilizing several computer systems and components that are interconnected via communication links, using one or more computer networks or direct connections. In one embodiment, such a system could have a fewer or a greater number of components than are illustrated in FIG. 12. Thus, the depiction of the system 1200 in FIG. 12 should be taken as being illustrative in nature and not limiting to the scope of the disclosure.

An embodiment can be implemented in a wide variety of systems, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In one embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In one embodiment, the protocol is a reliable connection-oriented protocol such as TCP. In one embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In one embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In one embodiment, the server(s) are capable of executing programs or scripts in response to requests from user devices, such as by executing one or more web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In one embodiment, the server(s) include one or more database servers, including without limitation those commercially available from Oracle®, Microsoft®, Sybase and IBM as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. In one embodiment, these reside in a variety of locations, such as on a storage medium local to (and/or resident in) one or more of the computers or remote from any or all of the computers across the network. In one embodiment, the information may reside in a storage-area network ("SAN") familiar to those skilled in the art. In one embodiment, files for performing the functions attributed to the computers, servers, or other network devices may be stored locally and/or remotely, as appropriate. In one embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In one embodiment, the system and various devices include a number of software applications, modules, services, or other elements located within at least one working memory device, including an operating system and application programs, such as a client application or web browser. In one embodiment, customized hardware is used and/or particular elements are implemented in hardware, software (including portable software, such as applets), or both. In one embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   designating source code of a first computer program as conforming to an authoritative set of coding rules;
   using a recurrent neural network based language model to determine the authoritative set of coding rules for the source code of the first computer program based at least in part on a content of the source code of the first computer program;
   determining whether source code of a second computer program satisfies the authoritative set of coding rules; and
   indicating whether the source code of the second computer program satisfies the authoritative set of coding rules.

2. The method of claim 1, wherein:
   the source code is selected from a source code repository that retains the first computer program and the second computer program; and
   the source code of the first computer program is designated as conforming as a result of the source code of the first computer program being older than the source code of the second computer program.

3. The method of claim 1, wherein:
   the source code is selected from a source code repository that retains the first computer program and the second computer program; and
   the source code of the first computer program is designated as conforming as a result of the source code of the first computer program being associated with an older last modification date than the source code of the second computer program.

4. The method of claim 1, further comprising:
   determining that the source code of the second computer program does not satisfy a particular rule in the authoritative set of coding rules;
   indicating that the source code does not comply with the particular rule; and
   indicating the particular rule.

5. The method of claim 1, wherein the method further comprises updating the recurrent neural network based language model based at least in part on the second computer program.

6. A system, comprising:
   one or more processors; and
   memory that stores computer-executable instructions that, if executed, cause the one or more processors to:
      determine, based at least in part on a set of machine-learning models including at least a recurrent neural network based language model, a set of coding rules for source code of a first computer program based at least in part on one or more tokens generated based at least in part on the source code of the first computer program; and
      apply the set of coding rules to source code of a second computer program.

7. The system of claim 6, wherein the recurrent neural network based language model is trained based at least in part on an authoritative source code file.

8. The system of claim 6, wherein the computer-executable instructions, if executed, further cause the one or more processors to select the source code of the first computer program from a collection of source code maintained in a source code repository, the collection of source code including the source code of the second computer program.

9. The system of claim 8, wherein the source code of the first computer program is selected as a result of being associated with an earlier origination date than the source code of the second computer program.

10. The system of claim 8, wherein the source code of the first computer program is selected as a result of being associated with fewer modifications over a time interval than the source code of the second computer program.

11. The system of claim 6, wherein the computer-executable instructions, if executed, further cause the one or more processors to:
    identify a portion of the source code of the second computer program that does not comply with an individual rule of the set of coding rules; and
    indicate the portion of the source code of the second computer program and the individual rule.

12. The system of claim 6, wherein:
    the source code of the first computer program is selected from a collection of source code maintained in a source code repository; and
    the computer-executable instructions, if executed, further cause the one or more processors to:
       determine that the source code of the second computer program complies with the set of coding rules; and
       store the source code of the second computer program to the source code repository.

13. A non-transitory computer-readable storage medium storing executable instructions that, as a result of being executed by one or more processors of a computer system, cause the computer system to at least:
    train a machine learning model based at least in part on a set of model parameters for a recurrent neural network language model;
    determine a set of coding rules for a first source code of a first computer program based, at least in part, on the recurrent neural network language model generated based at least in part on a content of the first source code of the first computer program;

use the recurrent neural network language model in accordance with the set of model parameters to determine whether a second computer program complies with the set of coding rules; and apply the set of coding rules to a second source code of the second computer program.

14. The non-transitory computer-readable storage medium of claim 13, wherein the executable instructions further comprise executable instructions that, as a result of being executed by the one or more processors, cause the computer system to:
determine that the second source code of the second computer program is not in accordance with the set of coding rules; and
indicate that the second source code of the second computer program is not in accordance with the set of coding rules.

15. The non-transitory computer-readable storage medium of claim 13, wherein:
the first source code of the first computer program is selected from a collection of source code maintained in a source code repository; and
the second source code of the second computer program is an updated version of the first source code of the first computer program.

16. The non-transitory computer-readable storage medium of claim 15, wherein the executable instructions further comprise executable instructions that, as a result of being executed by the one or more processors, cause the computer system to:
determine that the second source code of the second computer program complies with the set of coding rules; and
replace the first source code of the first computer program with the second source code of the second computer program.

17. The non-transitory computer-readable storage medium of claim 13, wherein the set of coding rules include a variable naming convention and a code commenting convention.

18. The non-transitory computer-readable storage medium of claim 13, wherein the executable instructions further comprise executable instructions that, as a result of being executed by the one or more processors, cause the computer system to select the source code of the first computer program from a collection of source code maintained in a source code repository, the collection of source code including the source code of the second computer program.

19. The non-transitory computer-readable storage medium of claim 18, wherein the source code of the first computer program is selected as a result of being associated with an earlier modification date than the source code of the second program.

20. The non-transitory computer-readable storage medium of claim 13, wherein the executable instructions further comprise executable instructions that, as a result of being executed by the one or more processors; cause the computer system to update the machine learning model based at least in part on a result of applying the set of coding rules to the second source code of the second computer program.

* * * * *